(No Model.)
J. D. WESTGATE.
Lubricating Shafting for Pulleys and Wheels.
No. 240,209.          Patented April 12, 1881.
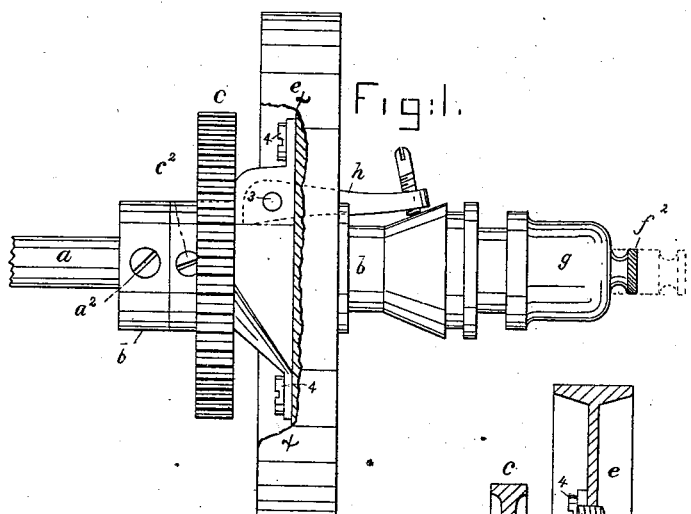
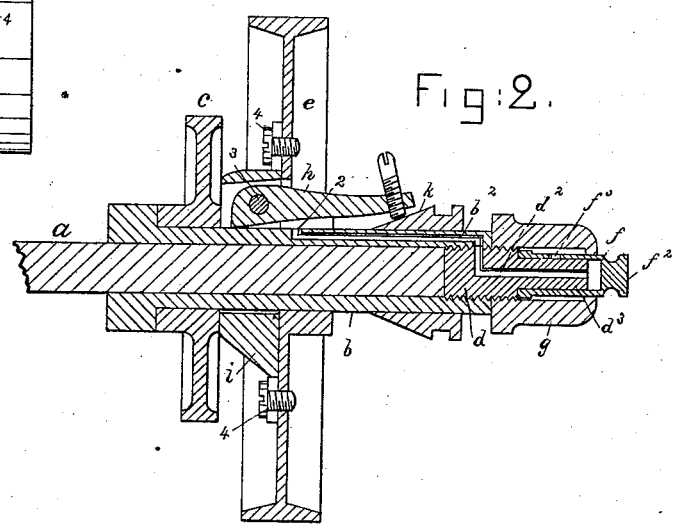
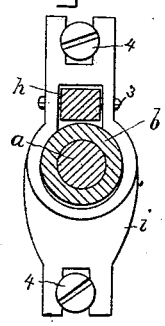
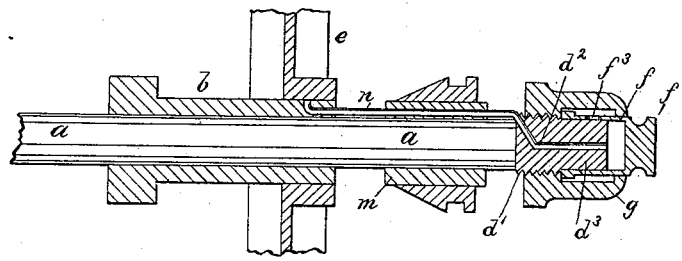
WITNESSES
V. D. Dearborn.
Arthur Reynolds.
INVENT
Joseph D. Westgate.
by Crosby Gregory Attys.

UNITED STATES PATENT OFFICE.

JOSEPH D. WESTGATE, OF SALEM, ASSIGNOR OF TWO-THIRDS TO GEORGE JENKINS AND E. Q. BACHELLER, OF LYNN, MASSACHUSETTS.

LUBRICATING SHAFTING FOR PULLEYS AND WHEELS.

SPECIFICATION forming part of Letters Patent No. 240,209, dated April 12, 1881.

Application filed June 30, 1880. (No model.)

*To all whom it may concern:*

Be it known that I, JOSEPH D. WESTGATE, of Salem, county of Essex, State of Massachusetts, have invented an Improvement in Lubricating Shafting for Pulleys and Wheels, of which the following description, in connection with the accompanying drawings, is a specification.

This invention relates to lubricating the shafting for driving-pulleys, and has more particularly for its object such a construction of the parts, as hereinafter specified, as will enable the oil or other lubricant to be forced or spurted out between the surfaces to be lubricated, and also to permit the surfaces to be oiled while the shaft and pulley are in motion.

My invention is shown as embodied in a clutch-pulley having substantially the construction of a pulley represented in Patent No. 229,652, heretofore granted to me, to which reference may be had.

Figure 1 represents, in side elevation, a clutch pulley or wheel containing my invention; Fig. 2, a longitudinal section of the same; Fig. 3, a cross-section of part of the apparatus on the line $x$ $x$, Fig. 1. Fig. 4 is a sectional detail of a modification.

My invention is herein supposed to be embodied on a loom, $a$, being the usual crank or lay-operating shaft. This shaft has secured upon it, by screw $a^2$, the sleeve $b$, and the gear $c$, which is the driven gear for the said shaft, is secured to this sleeve by the screw $c^2$. The sleeve $b$, at its outer end, (see Fig. 2,) has a screw-thread to receive the plug $d$, which, inserted in the sleeve, as in the said figure, touches, or nearly so, the end of the shaft $a$. The sleeve has an oil duct or passage, $b^2$, having its delivery-mouth through the outer surface of the sleeve at that part of the sleeve upon which the hub of the pulley or wheel $e$ runs. The plug has an oil-duct, $d^2$, that at one end is in communication with the duct $b^2$. The oil-ejector $f$ is composed of a loose thimble, fitted over the end $d^3$ of the plug. This ejector has at one end a head, $f^2$, by which to draw it longitudinally on the plug or turn it thereon, as may be desired, and at its other end, as in Figs. 2 and 4, a flange to prevent the removal of the ejector from the plug when the cap $g$ is screwed upon the plug; and between its ends this ejector has a hole, $f^3$, to permit the nose of an oil-can to be inserted therein when the ejector is drawn outward along the end of the plug far enough to place the said oil-hole $f^3$ outside of the cap, as is obvious may be done, the ejector at this time being stationary, while the shaft and pulley continue to run. The oil inserted in the ejector so drawn out will be forced along the ducts $d^2$ $b^2$ and out at 2, as the ejector is pushed inwardly upon the plug to the position shown in Fig. 2, thus forcing or squirting the oil out upon or between the surface of that part of the sleeve which forms the bearing for the hub of the pulley $e$. This ejector may be drawn out, as described, filled with oil, and pushed in to deliver oil upon the surface to be oiled while the shaft and pulley are in motion. The ejector being loose upon the pulley enables this to be readily done, for when the rotation of the ejector is arrested and it is drawn out by hand the ejector may be turned or rotated sufficiently to bring the oil-hole $f^3$ uppermost to receive the oil.

Were the ejector capable of moving only longitudinally on the plug, then the sleeve could not be oiled while in motion, nor could it be oiled when at rest unless the shaft and sleeve were stopped so as to bring the oil-hole uppermost. The dog $h$, having its fulcrum 3 upon the movable yoke $i$, surrounding the sleeve $b$, is secured to the pulley, so as to revolve with it, by means of the screws 4 in slots in the ears of the yoke. The opening in the yoke is enough larger in diameter than the sleeve to permit the yoke to move a short distance endwise when the short end of the dog is forced against the sleeve by the longitudinally-movable cone $k$, the hub at such time being so moved as to draw its concaved inner part snugly against one part of the sleeve, while the dog is forced against an opposite portion thereof. This cam will be operated by a hand or shipper lever in the usual way whenever it is desired to cause the dog to engage the sleeve, or to be disengaged from it.

In Fig. 1 the dotted lines at the right show the ejector drawn out to receive a charge of oil.

In Fig. 2 it is supposed that the cone is just commencing to turn the dog to cause it to engage the sleeve and enable the pulley to carry with it the sleeve and shaft $a$.

In Fig. 4, instead of prolonging the sleeve to the outer end of the shaft $a$, as in Fig. 2, and providing it with the oil-duct, I have stopped the sleeve at the outer face of the pulley-hub, have provided a short tubular bearing, $m$, for the cam, and have connected the oil-duct of the plug $d$ with the sleeve $b$ by means of a tube, $n$, the hollow interior of which serves as the oil-duct, the said tube being passed through the said bearing $m$, and being so attached therewith, and with the plug and sleeve, that the oil will be forced through the tube by the ejector, just the same as through the ducts $d^2$ $b^2$, before described.

I am aware that it is not new to provide a chambered nut with an oil-hole stopped by a screw, and from which the oil is fed into a duct in an axle-arm.

I am also aware that a chambered plug in communication with an oil-duct in a shaft has been covered by a screw-cap filled with a thick lubricant, as in United States Patent No. 228,137; but I am not aware of the prior existence of an ejector loosely fitted to a shaft and movable longitudinally thereon whereby a shaft or bearing may be oiled while the machinery is in motion.

I claim—

1. The rotating shaft and its oil-duct, and the clutch-pulley thereon, in combination with the loosely-held longitudinally-movable ejector, to quickly throw or force the oil through the oil-ducts of the shaft to be lubricated, the said ejector being provided with an opening, $f^3$, whereby the oil may be fed into the ejector while it is held at rest and while the shaft and pulley are in motion, substantially as described.

2. In means for oiling clutch-pulleys, a shaft and pulley, and a duct to lead oil to the surfaces of the pulley and shaft, which are in contact, combined with the plug having an oil-duct, a longitudinally loosely-held ejector provided with an oil-hole to receive oil and permit it to be forced through said ducts to the place or thing to be lubricated, and the cap $g$, the cap permitting the shaft and pulley to be lubricated with thin oil while in motion, substantially as described.

In testimony whereof I have signed my name to this specification in the presence of two subscribing witnesses.

JOSEPH D. WESTGATE.

Witnesses:
Jos. P. Livermore,
N. E. C. Whitney.